Nov. 12, 1929.          L. T. ELIEL          1,735,109
PROCESS OF AND APPARATUS FOR MAKING AERIAL PHOTOGRAPHS
Filed Feb. 8, 1927          5 Sheets-Sheet 1
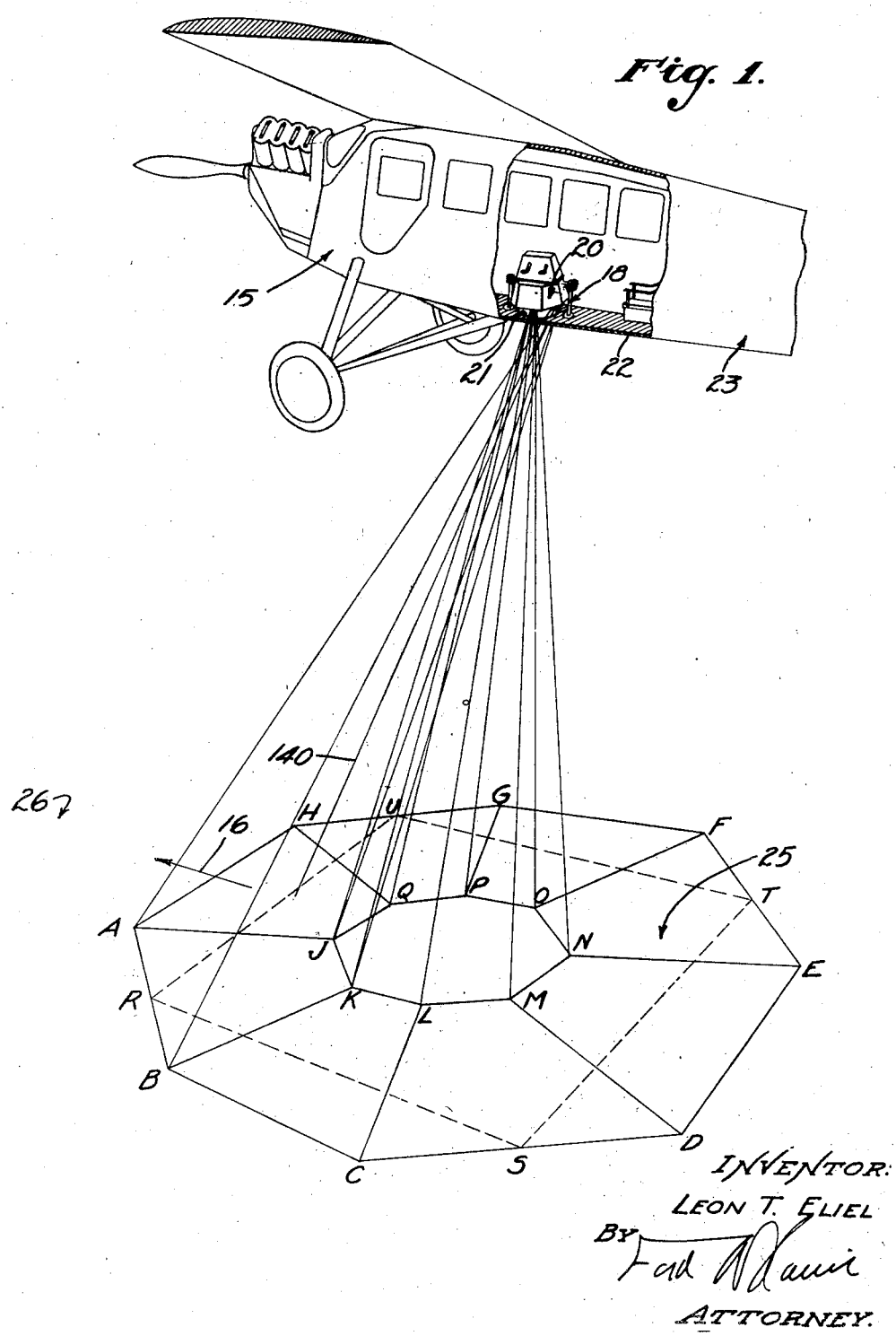
INVENTOR:
LEON T. ELIEL
BY
ATTORNEY.

Nov. 12, 1929.                    L. T. ELIEL                    1,735,109
            PROCESS OF AND APPARATUS FOR MAKING AERIAL PHOTOGRAPHS
                            Filed Feb. 8, 1927         5 Sheets-Sheet 2
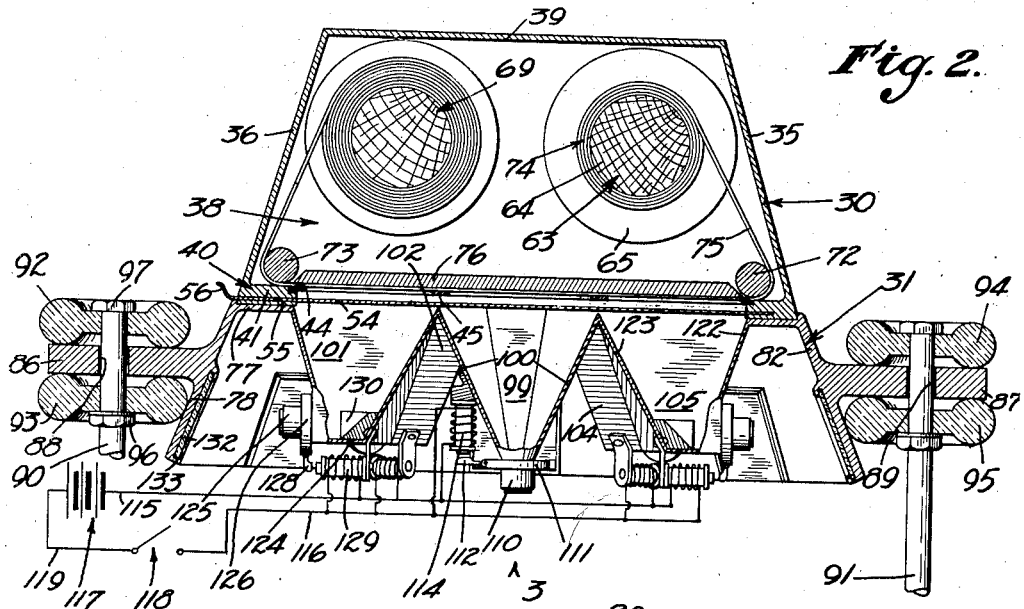
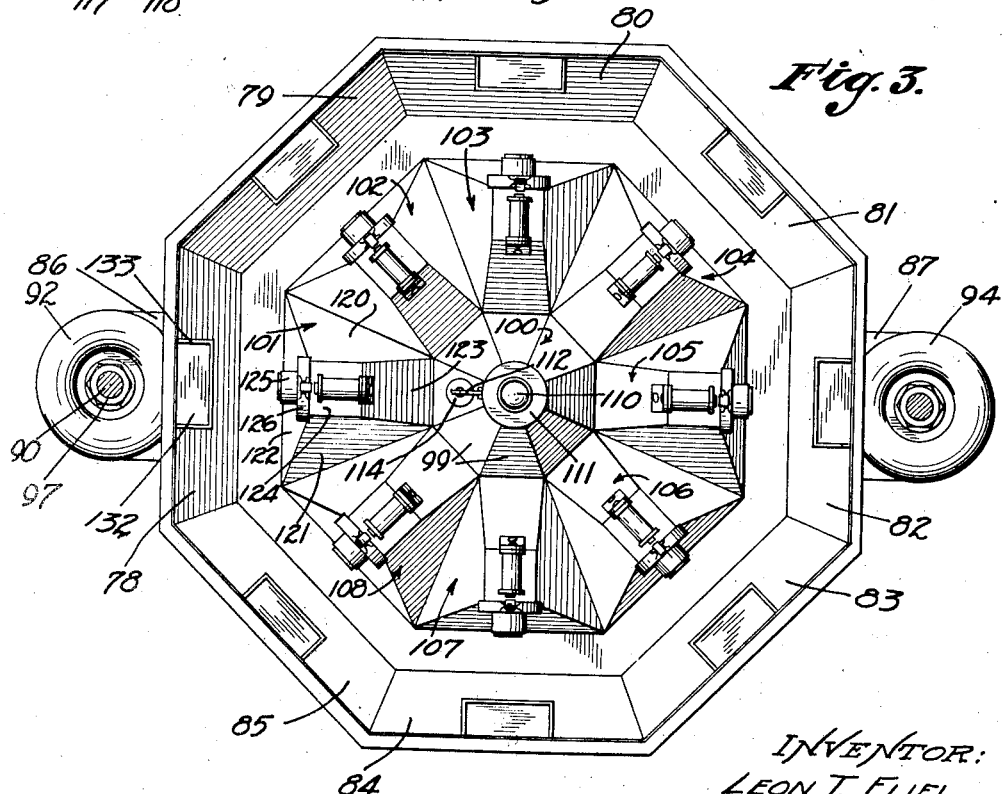
INVENTOR:
LEON T. ELIEL
By
ATTORNEY.

Nov. 12, 1929.　　　　L. T. ELIEL　　　　1,735,109
PROCESS OF AND APPARATUS FOR MAKING AERIAL PHOTOGRAPHS
Filed Feb. 8, 1927　　　5 Sheets-Sheet 3

INVENTOR:
LEON T. ELIEL
BY
ATTORNEY.

Nov. 12, 1929.  L. T. ELIEL  1,735,109
PROCESS OF AND APPARATUS FOR MAKING AERIAL PHOTOGRAPHS
Filed Feb. 8, 1927  5 Sheets-Sheet 4
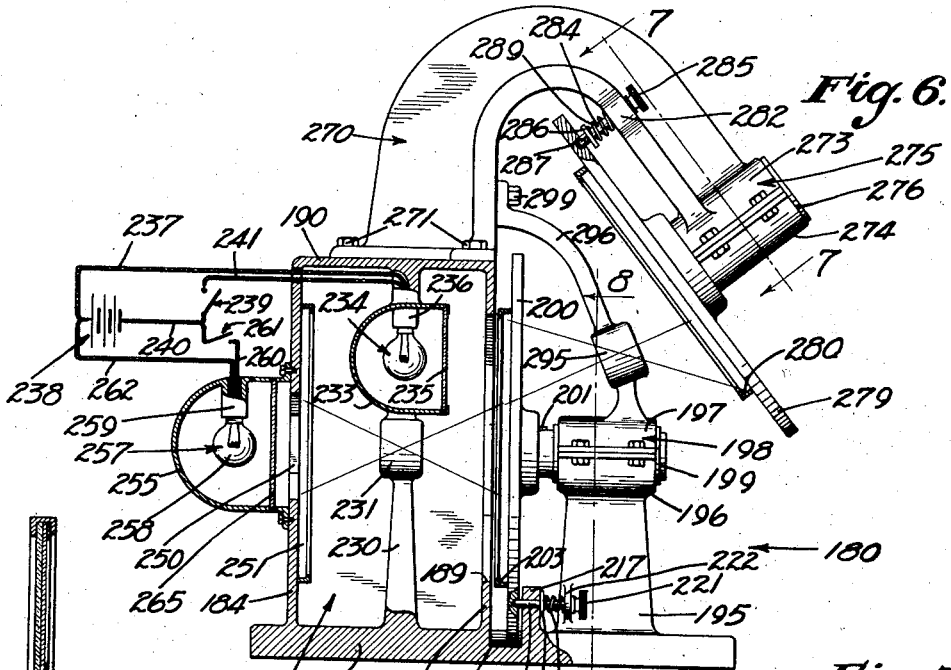
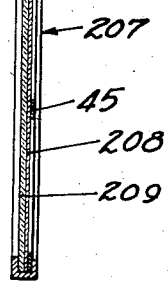
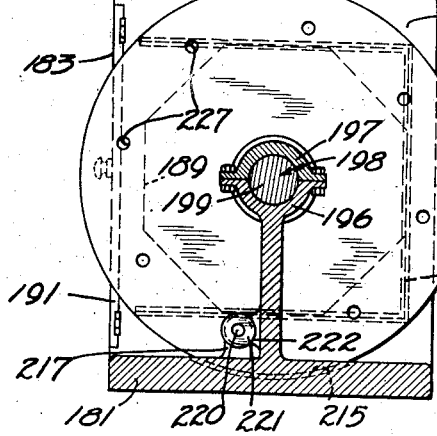
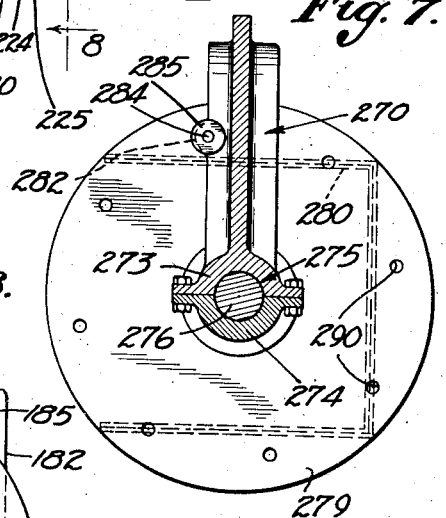
INVENTOR:
LEON T. ELIEL
BY
ATTORNEY.

Nov. 12, 1929.   L. T. ELIEL   1,735,109
PROCESS OF AND APPARATUS FOR MAKING AERIAL PHOTOGRAPHS
Filed Feb. 8, 1927   5 Sheets-Sheet 5

INVENTOR:
LEON T. ELIEL
BY
ATTORNEY.

Patented Nov. 12, 1929

1,735,109

UNITED STATES PATENT OFFICE

LEON T. ELIEL, OF LOS ANGELES, CALIFORNIA

PROCESS OF AND APPARATUS FOR MAKING AERIAL PHOTOGRAPHS

Application filed February 8, 1927. Serial No. 166,729.

My invention relates to the art of photography and more particularly to a process and apparatus for making aerial photographs.

It is the present practice in making aerial photographs to fly a camera-equipped airplane in substantially parallel paths over a given area of ground, taking photographs over approximately equal intervals of time. These photographs are later combined into a unitary mosaic map. This process is wasteful of both time and material as the area which may be covered by a single picture is greatly restricted by the narrow covering power of the lenses now used.

It is an object of my invention to provide a means of greatly reducing this wastage of labor and material in making mosaic aerial maps by providing an extremely wide angle camera, thus increasing the maximum area photographed at each operation of the shutter, and providing a means of quickly and economically mapping large areas of country from the air.

It is another object of my invention to produce a camera which facilitates the economical and correct plotting of contour lines from an aerial map through stereoscopic means.

Another object of my invention is to economically and correctly produce an aerial photograph suitable for use on a plane table in plotting contours.

A still further object of my invention is to produce a camera for taking a number of pictures simultaneously, these pictures being so taken and of such a form that they can be transformed into a unitary picture without mosaicing.

Another object of my invention is to provide a superior aerial photograph wherein corrections for tilt of obliquely exposed portions of the picture are automatically and correctly made.

Still a further object of my invention is to provide an aerial photograph covering more ground at each exposure, thus minimizing the number of ground control points required in a given area to control the scale orientation and tilt of the picture.

A further object of my invention is to eliminate the necessity of a glass plate on which the film is placed during exposure, thus greatly reducing halation and refraction effects caused by this glass.

Another object of my invention is to provide a camera in which trouble due to static formed on the unrolling film is eliminated.

Further objects and advantages will be made apparent from the description in the drawings in which I illustrate my invention.

Fig. 1 is a perspective utility view showing an airplane equipped with a camera of my invention flying above a section of country.

Fig. 2 is a medial cross sectional view of the camera of my invention.

Fig. 3 is a bottom view of the camera of my invention taken substantially in the direction of the arrow 3 of Fig. 2.

Fig. 6 is a side view, partially sectioned, of the transforming camera of my invention.

Fig. 7 is a sectional view taken on the line 7—7 of Fig. 6.

Fig. 8 is a sectional view taken on the line 8—8 of Fig. 6.

Fig. 9 is a medial vertical section of a negative or positive frame of my invention.

Figure 4:
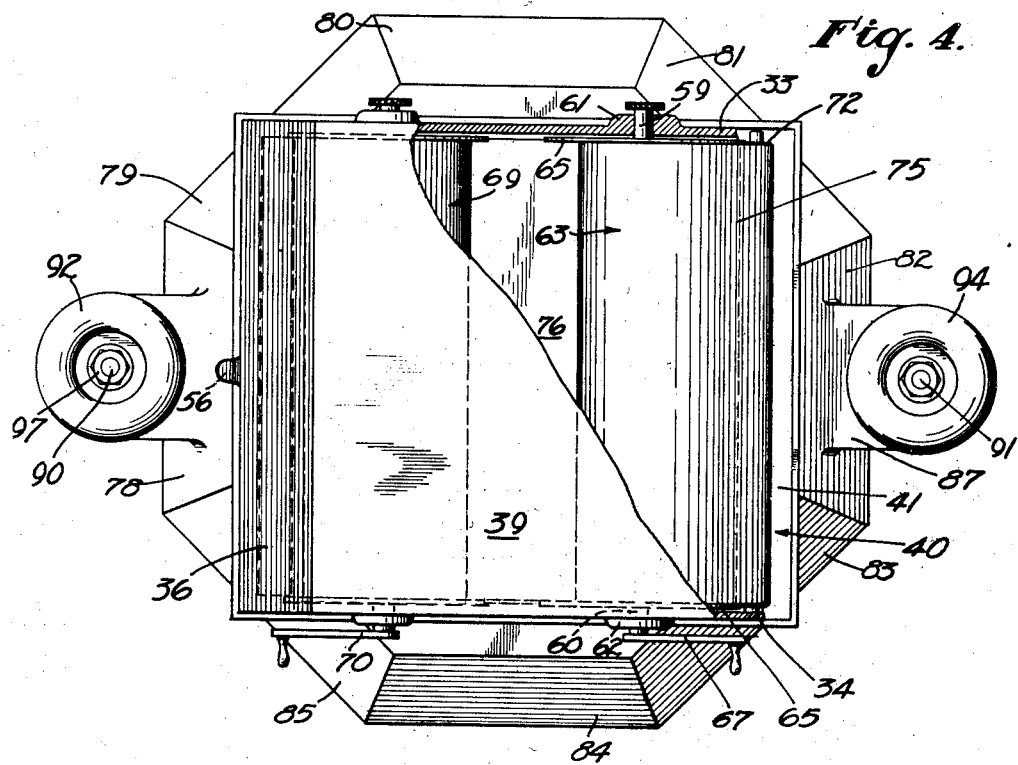
Fig. 4 is a partially sectioned top view of the camera of my invention.

Fig. 1 shows an airplane 15 flying in a direction indicated by the arrow 16. Mounted in the airplane 15 on supports 18 is a camera 20 of my invention which is pointed downward through an opening 21 in the floor 22 of the fuselage 23 of the airplane 15 so as to cover an octagonal area 25 on the ground 26.

The camera of my invention is of the roll film type and consists primarily of a magazine 30 and a camera structure 31. Referring to Figs. 2 and 4, the magazine 30 is composed of side walls 33 and 34 which are joined to end walls 35 and 36, thus forming a film chamber 38 which is covered by a top portion 39. A light-proof bottom portion 40 consists of flange members 41 which extend inward from each of the end walls 35 and 36 and from each of the side walls 33 and 34. A groove 44 is cut on the inner side of the flange 41 and is adapted to hold a negative mask 45.

Figure 10:
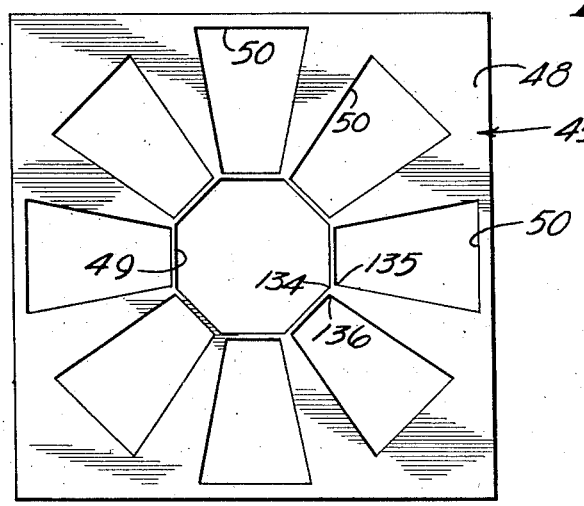
Fig. 10 is a top view of a negative mask.

The negative mask 45, as clearly shown in Fig. 10, is made of any thin opaque material 48 from which a central octagonal aperture 49 has been cut. Surrounding the aperture 49, and equally spaced from each other, are trapezoidal side apertures 50 of a shape substantially as shown in Fig. 10. The utility of this shape will be apparent from the later description of the operation of the camera.

The bottom portion 40 of the magazine 30 has a light-proof slide 54 removably disposed in a slide 55 by means of a handle 56 shown in Figs. 2 and 4. This slide 54 is for the purpose of closing the magazine 30 so that it can be loaded in a dark room and attached to the camera 20 in daylight. The slide 54 must necessarily be drawn before an exposure can be made.

Pivotably mounted between side walls 33 and 34 on slidable pivot pins 59 and 60, which extend through bosses 61 and 62 of side walls 33 and 34 respectively, is a film spool 63 consisting of a core 64 and circular end members 65. The pivot pins 59 and 60 engage the core 64. A crank 67 is rigidly attached to the outer end of the pivot pin 60 outside of the boss 62, and forms a means of turning the film spool 63 from the outside of the magazine 30. Mounted at the other end of the magazine 30 in the film chamber 38 is an identical film spool 69 similarly pivoted and controlled externally to the magazine 30 by a crank 70. Pivotably disposed below and to the right of the film spool 63 is a static roller 72 which is pivoted by means of end pins to side walls 33 and 34, as clearly shown in Fig. 4. A similar static roller 73 is pivotably mounted below and to the left of the film spool 69. Static rollers 72 and 73 are mounted a distance above the top face of the flange 41 equal to the thickness of the film being used. These static rollers 72 and 73 are composed of a metallic substance and are grounded to the engine of the airplane through a suitable means not shown in the drawings. By grounding these static rollers I have found that trouble due to static discharges exposing minute portions of a rolled film when this rolled film is unwound from the spool is completely eliminated. A roll of film 74 is wound around the core 64 of the film spool 63 with its sensitive side out. The film 75 is passed downward and under the static roller 72, across the upper surface of the negative mask 45, around the static roller 73, and wound on the film spool 69 in the conventional manner. A pressure plate 76 is adapted to hold the sensitized surface of the film 75 in contact with the negative mask 45.

The lower edge of the bottom portion of the magazine 30 is adapted to snugly fit in an upper grooved plate 77 of the camera structure 31 in which it is securely fastened by suitable fastenings, not shown in the drawings. Extending downward from the upper grooved plate 77 are side walls 78 to 85 inclusive which form a truncated prismic shell. Extending from a pair of opposite side walls 78 and 82 are bosses 86 and 87. Holes 88 and 89 in the bosses 86 and 87 respectively are adapted to slidably receive supporting rods 90 and 91 which are attached to the floor 22 of the fuselage 23 of the airplane 15, as shown in Fig. 1. Disposed above and below the boss 86 are webbed doughnut-shaped rubber shock absorbers 92 and 93 which engage the upper and lower surfaces of the boss 86 respectively. Shock absorbers 92 and 93 are held in contact with these upper and lower faces of the boss 86 by means of nuts 96 and 97 mounted on supporting rod 90 respectively below and above the web portions of the shock absorbers 92 and 93. A similar set of shock absorbers 94 and 95 connect the boss 87 to the supporting rod 91.

Inside the side walls 78 and 85 inclusive and centrally spaced therefrom is a central light compartment 99 formed of walls 100 and supported by means of a series of eight surrounding light chambers 101 to 108 inclusive, which are in turn supported by the upper grooved plate 77 of the camera structure 31, as clearly shown in Figs. 2 and 3. The walls 100 of the central light chamber 99 form a truncated hexagonal prism. At the lower end of the central light chamber 99 and securely attached to the side walls 100 is a central lens 110 mounted below a shutter 111. An iris diaphragm is mounted between the shutter 111 and the lens 110 but is not shown in the accompanying drawings. The shutter 111 is tripped by a shutter armature 112 being moved upward.

Securely mounted on one of the side walls 100 of the central light chamber 99 is an electro-magnet 114 so placed that when a current is passed through its windings, the shutter armature 112 will be drawn upward, thus tripping the shutter 111 and momentarily exposing the film 75 to the action of light rays originating from that part of the ground directly below the lens 110. The winding of the electro-magnet 114 is connected between wires 115 and 116 which are attached respectively to the negative side of a battery 117 and one terminal of a switch 118, the remaining terminal of the switch 118 being connected to the positive terminal of the battery 117 by means of a wire 119. Thus when the switch 118 is closed a current will flow from the battery 117 through the wire 119, the switch 118, the wire 116, and through the winding of the electro-magnet 114, whence it returns to the battery through the wire 115, thus tripping the shutter 111. When the switch 118 is opened the shutter armature 112 returns to its "cocked" position shown in Fig. 2.

Each of the eight surrounding light chambers 101 to 108 inclusive are exactly similar, being formed of side walls 120 and 121 joined to trapezoidal outer and inner end walls 122 and 123 respectively, the whole forming a truncated figure, as best shown in Figs. 2 and 3. The upper part of this figure is trapezoidal in cross section and the lower part rectangular, the lower end being closed by a bottom plate 124, the complete structure forming a light-proof compartment. A lens 125 and a shutter 126 are mounted in the outer end wall 122 of each of the surrounding light chambers 101 to 108 inclusive so that the principal axis of the lens 125 is substantially horizontal. Each lens and shutter combination is equipped with an iris diaphragm similar to that of the central lens 110 for controlling the amount of light passing through the lens 125 when the shutter 126 is operated.

Each shutter 126 is tripped by a shutter armature 128 being pulled radially inward. This is accomplished simultaneously with the tripping of the central shutter 111 by an electro-magnet 129 mounted below the bottom plate 124 of each of the surrounding light chambers 101 to 108 inclusive. The electro-magnets 129 of each of the surrounding light chambers are connected in parallel with the electro-magnet 114 of the central light chamber 99 so that when the switch 118 is closed current simultaneously flows through all the nine electro-magnets, thus tripping the nine shutters exactly in unison.

A prism or other reflector 130 is securely mounted inside each surrounding light chamber 101 to 108 inclusive. directly back of the lens, in the position shown in Fig. 2, so as to turn the rays of light from the lens 125 through an angle of substantially 90° and impinging these rays on the sensitized surface of the film 75 through one of the trapezoidal side apertures 50 of the negative mask 45. Mounted directly in front of each lens 125, and at a suitable angle with the horizontal, is a mirror 132 secured inside of each side wall 78 to 85 inclusive of the camera structure 31 by means of a frame 133.

The camera of my invention is adapted to record the details of an area of the ground 26 indicated at 25 and determined by the points A B C D E F G H which are in turn determined by the extreme outer corners of the trapezoidal apertures 50 of the negative mask 45, as will be apparent later. In case the plane of the film is parallel to the plane of the ground, this figure will be a regular octagon.

A central figure of an octagon—and geometrically similar to octagon A B C D E F G H in the event that the plane of the film and the plane of the ground are parallel—is determined by the outer corners of the central octagonal aperture 49 of the negative mask 45 through rays of light passing through the central lens 110 and intersecting the ground at points J, K, L, M, N, O, P and Q, which, when joined, form said central figure. The central lens 110 thus photographs an area J K L M N O P Q and records it in the form of a central octagon on the film 75.

The camera is so designed that the optical equipment of each of the light chambers 101 to 108 inclusive records one of the surrounding areas A J Q H, Q P G H, P O F G, etc., on the film 75 through the trapezoidal aperture 50 of the negative mask 45 which is directly above it. Each of these surrounding areas is covered by the lens 125 on the opposite side of the principal axis of the central lens from the area itself, as clearly shown in Fig. 5. Thus the mirror, lens, and prism of light chamber 105, for instance, project an image of area A J Q H on the film 75 through the trapezoidal aperture 50 disposed directly above this light chamber 105.

From the above it should be clear that an infinitesimal point Q, for instance, projects three images of itself on the film 75. The first image will be cast by a ray of light originating at Q, passing through central lens 110, and impinging as an image Q' at a corner 134 of the central aperture 49, as shown in Fig. 10. A second image is formed by a ray of light from the point Q striking the mirror 132 of the light chamber 105 at $Q_1$, being reflected therefrom through the lens 125 and being deflected upward by the prism 130, finally striking at $Q_2$ the film 75 at a point 135 which is an inner corner of one of the trapezoidal side apertures 50 of the negative mask 45. Still a third image of the point Q is formed at an inner corner 136 of an adjacent trapezoidal side aperture 50, being impinged thereon by means of the mirror 132, the lens 125, and the prism 130 of the light chamber 104. These three images of the infinitesimal point Q will be joined into a single image of this particular point by the apparatus to be described later.

Figure 5:
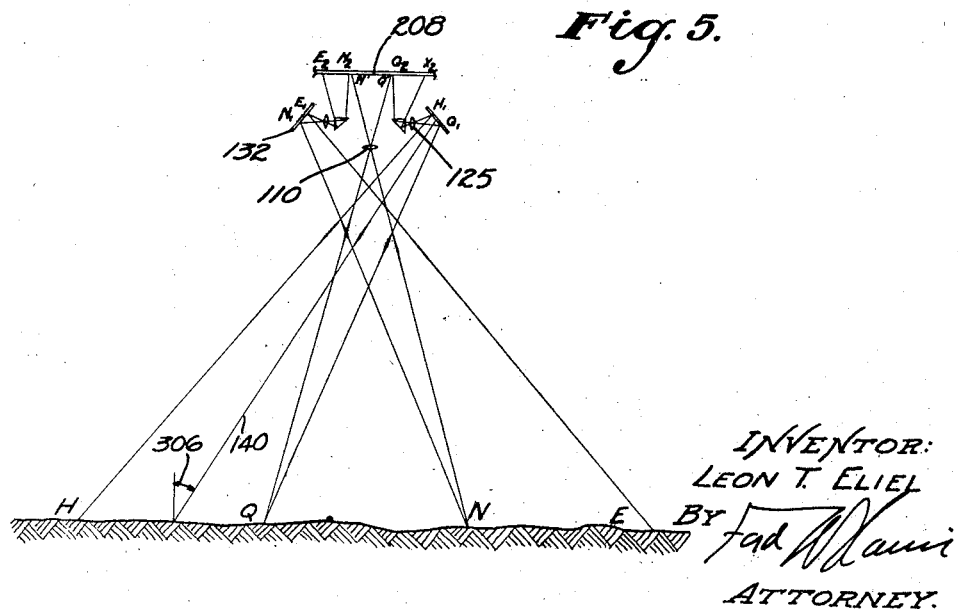
Fig. 5 is a diagrammatic view, greatly exaggerated, showing the optical system of the camera of my invention and is taken in the vertical plane through the axis of flight of the airplane shown in Fig. 1.

It should be understood that Fig. 5 is only diagrammatic to show the paths of the light rays as they form between the ground and the film 75, and that the distance between the mirrors shown in Fig. 5 is very much distorted in comparison to the height of the mirrors from the ground. Thus the ray of light Q—Q' is shown as diverging from the ray of light Q—$Q_1$. In actual practice the mirrors 132, shown diagrammatically in Fig. 5, are much closer together in comparison to their distance from the ground, thus making rays Q—Q' and Q—$Q_1$ substantially parallel. Thus there will be no fixed height at which the camera will necessarily be operated inasmuch as the ray Q—$Q_1$ and the ray Q—Q' will be substantially the same ray at all elevations from which the pictures might be taken and will not intersect only at a single point on the ground, as shown.

It should be clear that the perspective of each trapezoidal side area as recorded on the film 75 through the trapezoidal side aperture 50 of the negative mask 45 would be of identical oblique perspective to a view taken by an ordinary camera if pointed in the direction of the central ray 140 between the area A J Q H and the mirror 132, for example, as clearly shown in Fig. 5. A negative taken at this oblique angle would necessarily have to be corrected for what is called "tilt" before it could be used as a vertical perspective in map making, such an image being hereinafter termed a distorted image. I accomplish this correction for tilt in a device which I have called a transforming camera and which is clearly shown in Figs. 6, 7, 8, and 9.

The transforming camera 180 consists of a base 181 from which side walls 182 and 183 are extended upward. A rear wall 184 and a front wall 185 are joined to the side walls 182 and 183 and to the base 181 forming a light chamber 186. The front wall 185 has an octagonal opening 189 cut therein, the purpose of which will be made apparent. A top 190 is formed integral with the side walls 182 and 183 and the front and rear walls 185 and 184. A door 191 is hinged to the side wall 183, thus making the light chamber 186 readily accessible to the operator.

A bearing bracket 195 is extended upward from the base 181 in front of the front wall 185 and forms at its upper end a journal 196, which, in cooperation with a cap 197, forms a bearing 198. A shaft 199 is rotatably supported in the bearing 198 and supports a circular plate 200 which is concentrically fastened thereto by a key 201.

Attached to the front of the plate 200 is a front frame guide 203 which is adapted to slidably receive a positive or negative frame 207. The frame 207 is shown in section in Fig. 9 and is adapted to hold a film portion 208 of the film 75, a negative mask 45 and a glass supporting plate 209. This frame 207 can also be used to securely hold a printing medium such as a sensitized paper, film or glass. A groove 215 is cut in the base 181 of the transforming camera 180 in order to receive the circular plate 200 and the corners of the frame guide 203 when revolved.

Extending upward just in front of the groove 215 is a projection 217 which is drilled to slidably receive a pin 220 having a head 221. The pin 220 also extends through a lug 222 formed integrally with the bearing bracket 195. A washer 224 is formed integrally with the pin 220, as shown in Fig. 6. Compressed between the washer 224 and the lug 222 is a spring 225 which is adapted to keep the pin 220 moved to the left. The extreme left end of the pin 220 is adapted to enter any of a series of eight equally spaced holes 227 in the circular plate 200, as clearly shown in Fig. 8, when the pin 220 is held to the left by the spring 225. This mechanism secures the circular plate 200 in any of a series of eight positions.

A lens and reflector bracket 230 is fastened in the light chamber 186 between the base 181 and the top 190 of the transforming camera 180. The bracket 230 supports a lens in the lens mouth 231, the principal axis of which lens is identical with the longitudinal axis of the shaft 199. Supported above the lens mount 231 is an upper reflector 233 which carries a light source 234, and a diffusing screen in the form of a piece of ground glass 235. The light source 234 is shown as an electric bulb which is screwed into a socket 236 attached to the top 190. This light source 234 is connected by a wire 237 to a battery 238, the other side of the battery being connected to a switch 239 by means of a wire 240. The switch 239 is also connected to the light source 234 by means of a wire 241. Thus, when the switch 239 is closed current is supplied from the battery 238 through the wire 237 to the light source 234, returning to the battery through the wire 241, the switch 239 and the wire 240.

The back 184 of the transforming camera 180 has an octagonal opening 250 which is slightly larger than the central octagonal aperture 49 of the negative mask 45. A frame guide 251 is mounted in the light chamber 186 on the inside of the rear wall 184 in such a position that when the frame 207 is inserted in the frame guide 251 the central octagonal aperture of the negative mask 45 mounted in the frame 207, and thus the central octagonal image on the negative, will be concentric with the principal axis of the lens in the mount 231. A rear reflector 255 is mounted on the rear of the rear plate 184 opposite the octagonal opening 250. Mounted in the reflector 255 is a source of light 257 composed of an electric bulb 258 screwed into a socket 259 which is secured to the reflector 255. A wire 260 joins one terminal of the bulb 258 to a switch 261, which is also connected to the battery 238 through the wire 240. Another wire 262 connects the remaining terminal of the bulb 258 to the remaining terminal of the battery 238, thus when the switch 261 is closed current will flow from the battery through the wire 262, the filament of the bulb 258, the wire 260, the switch 261, and the wire 240. Disposed between the source of light 257 and the hexagonal opening 250 of the rear plate 184 is a ground glass diffusing screen 265. The source of light 257 is for the purpose of projecting light rays through a film portion 208, held in the frame 207 and the frame guide 251, through the lens in the lens mount 231 and project the image on a printing medium held in the front guide frame 203.

A curved bracket 270 is bolted to the top 190 of the transforming camera 180 by means of bolts 271. The bracket 270 is substantially V-shaped in cross section for the sake of rigidity. A journal 273 is provided at the extreme outward end of the bracket 270, which, together with a cap 274 bolted thereto, forms a bearing 275 which receives a shaft 276 on the lower end of which is a rigidly mounted circular plate 279 similar to the circular plate 200 previously described. Disposed on the lower face of the circular plate 279 is a frame guide 280 which is adapted to receive the frame 207.

Slidably mounted in a lug 282 of the bracket 270 is a pin 284 provided with a head 285. A washer 286 is held in engagement with a pin 287 through the shaft 284 by means of a compression spring 289 which is compressed between the washer 286 and the lug 282 of the bracket 270. The lower end of the pin 284 is adapted to snugly engage any one of a series of eight concentric equally spaced holes 290 drilled in the upper part of the circular plate 279 in such a manner as to hold the plate 279 in a rigid position. A lens mount 295 is formed integrally with the cap 197 of the bearing 198 and is connected by an arm 296 to the bracket 270 by means of a bolt 299.

The plane of the lens in the lens mount 295, the plane of the frame guide 280, and the plane of the frame guide 203 should intersect in the same straight line. Furthermore, the angle between the frame guide 280 and the frame guide 203 should be equal to the angle between the central ray 140 and the vertical, this angle being designated by the number 306 in Fig. 5, assuming that the film in the camera is horizontal at the time of exposure. With these angles correct the correction for tilt will be correctly made. Thus, the purpose of the source of light 234 is to project light rays through one trapezoidal side portion of a film portion 208 held in the frame 207 in the front frame guide 203. The lens in the lens mouth 295 projects an image, corrected for the defect of tilt, onto a printing medium held in the frame guide 280.

The operation of my invention is as follows: A loaded film magazine 30 is attached to the camera 20. While the airplane 15 is flying at a substantial height (18,000 feet if a square area of practically 79 square miles is to be covered with each exposure) the slide 54 is withdrawn by means of the handle 56, and at the desired instant the shutters of the nine lenses are tripped simultaneously by instantaneously closing the switch 118, the diaphragms being first correctly adjusted for the desired amount of light to be passed through them. A new portion of the film 75 is drawn into the focal plane of the lenses by turning one of the cranks 67 or 70 the correct amount at which time the camera is in condition for making another exposure. After a suitable number of exposures have been made, the film 75 is removed from the magazine 30 of the camera 20 and is developed and fixed in the usual manner. Substantially a square piece of film is used at each exposure but the area actually exposed to the light will, of course, be only those areas not covered by the negative mask 45. Thus, after development, the image appearing on the film will be of the shape corresponding to the apertures in the negative mask 45.

This film is mounted in a frame 207 in back of the negative mask 45 exactly similar to the one used in taking the picture and in front of a glass plate 209 which holds the film in a true plane. This guide is inserted in the frame guide 251 of the transforming camera 180. When in this position the portion of the negative inside the central octagonal portion of the negative mask 45 will be directly in front of the octagonal opening 250 of the rear wall 184 of the transforming camera 180. At this time the printing medium is secured in a frame exactly similar to the frame 207, this frame being inserted in the front frame guide 203. The lens in the lens mount 231 is adapted to impinge the octagonal image of the central portion of the film 75 on the printing medium held in the frame 207 which is held in position by the frame guide 203. At this time the switch 261 is closed for a length of time to correctly expose the printing medium.

The frame 207 holding the printing medium is removed from the front frame guide 203 and is inserted in the frame guide 280 of the circular plate 279 without turning the printing medium about its own axis. The frame 207 which contains the film portion 208 and the negative mask 45 is withdrawn from the frame guide 251 and inserted into the frame guide 203 without rotating the frame about its own axis. The source of light 234, the trapezoidal side aperture 50 of the negative mask 45 (which will at this time be directly in front of the light source 234), the lens in the mount 295, and the circular plate 279 are so positioned that light passing through the trapezoidal side aperture 50 will be converged by the lens in the mount 295, and an image of that trapezoidal portion of the film portion 208 will be impinged on the printing medium held in the frame 207 now in the frame guide 280.

Due to the fact that the plane of the plate 279, and consequently the plane of the printing medium, is at an angle with the film portion 208 now held in the frame guide 203, this angle being equal to the equivalent angle of obliquity at which the negative was made, the image appearing on the printing medium will appear as a true vertical perspective according to the laws of correction for tilt. Furthermore, the transforming camera is so designed that the image cast by the film through this trapezoidal side aperture 50 of the negative mask 45 will be enlarged sufficiently to exactly match one side of the image cast by the central octagonal portion of the film portion 208 when printed through the lens in the lens mount 231.

Figure 11:
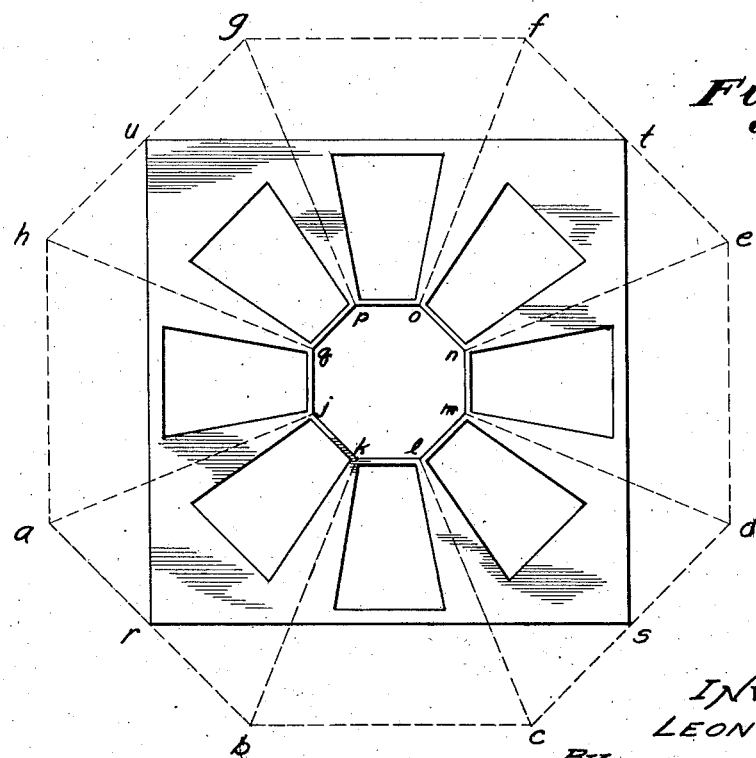
Fig. 11 shows the relationship between the shape of the negative mask and the finished picture.

This can best be understood by reference to Fig. 11 which shows a shaded negative mask with relation to a finished print. Referring to this figure the octagonal portion $j k l m n o p q$ is transferred to the printing medium without enlargement or without correction for tilt. Thus the octagon $j k l m n o p q$ will be of the same size and shape as the central octagonal aperture 49 of the negative mask 45. Now, when one of the images of the trapezoidal side portions of the film portion 208 is impinged on the printing medium, the transforming camera is so designed that the area covered by this trapezoidal side portion is transformed into an area corresponding to the area $m d e n$, as shown in Fig. 11. The image will now appear as a true vertical perspective view.

With the apparatus in this position, the source of light 234 is energized by closing the switch 239 for a period of time to expose the printing medium to the density corresponding to that produced by the action of the source of light 257 when printing the central octagonal portion of the film portion 208. The pin 220 is next drawn to the left and the circular plate 200 is revolved one-eighth of a turn when the pin 220 is released, thus securing the plate 200 in a fixed position. The pin 284 is also withdrawn from the circular plate 279 and this circular plate 279 is revolved one-eighth of a turn in a direction opposite to the direction of rotation of the circular plate 200, after which the pin 284 is returned to its position in a hole 290 of the circular plate 279, thus holding it in a fixed position. The switch 239 is again closed for the correct time of exposure, thus printing an image $n e f o$ on the printing medium. As shown in Fig. 11, the transforming camera 180 and the negative mask 45 are so designed that this exposed portion of the printing medium will exactly match one side of the portion $m d e n$, previously printed, and will also exactly match the side $m$—$n$ of the central octagon printed by the lens in the lens mount 231.

Each plate 200 and 279 is again rotated one-eighth of a revolution in the correct direction and another trapezoidal side portion of the film portion 208 is printed on the printing medium by closing the switch 239. Similarly, this portion will correspond to an area $f o p g$, as shown in Fig. 11, and will exactly match one side of the area $n e f o$ and the side $o$—$p$ of the octagonal central image previously printed. This operation is repeated until each of the eight trapezoidal side portions of the negative have been projected on the printing medium, at which time the finished image would ordinarily have produced a figure $a b c d e f g h$ which corresponds to the area $A B C D E F G H$ on the ground 26. However, as I have shown the printing medium of the same square shape and size as the original film portion 208, the result will be a square picture $r s t u$ corresponding to a square area $R S T U$ on the ground 26. It should be understood, however, that by changing the shape of the printing medium to an octagon, corresponding in size to the figure bounded by the points $a, b, c, d, e, f, g$ and $h$, it would be possible to secure full advantage of every inch of the film portion 208 as exposed, instead of not using the outer portions $s d e t, t f g o, u h a r$, and $r b c s$.

In the description and claims I have used the word "film" to indicate a sensitized film of emulsion with a suitable backing. In the drawings this backing is shown to be celluloid, but it is within the scope of my invention and claims to use any backing medium such as glass or other flexible or inflexible material, to the use of which my camera could be readily adapted through conventional and well known means.

I claim as my invention:

1. A process of making photographs, comprising: simultaneously exposing a plurality of film portions maintained in a single plane through lenses having non-parallel principal axes; and transforming said film portions into a unitary picture such as could be registered by a perfect extremely wide angle lens.

2. A process of making photographs, comprising: photographing a central portion of a subject along the principal axis of a camera; photographing side portions completely surrounding said central portion obliquely to said principal axis; and subsequently transforming the views so photographed into a unitary picture such as could be registered by a perfect extremely wide angle lens.

3. A process of making photographs which comprises: making a negative image of a central portion of a subject; making a negative image of the portions of said subject completely surrounding said central portion; and transforming said negative images into a unitary positive image of the subject.

4. A process as defined in claim 3 in which said negative image of the surrounding portions is made in segments, each segment being photographed through a lens having a central axis which is non-parallel to the central axis of the lens photographing the central portion.

5. A process of making photographs which comprises: impressing on a film lying in a single plane a central image of a subject, surrounded by segmental side images of portions of the subject completely surrounding the area included in said central image.

6. In combination: a camera structure supporting a sensitized film in a single plane; a central lens mounted on said camera structure and having a principal axis extending toward the subject to be photographed; and a plurality of auxiliary lenses grouped entirely around said central lens, all of said auxiliary lenses being adapted to photograph portions of said subject at equal angles relative to said principal axis.

7. In combination: a camera structure supporting a sensitized film in a single plane; a plurality of lenses mounted on said camera structure and casting images on said film, said lenses having non-parallel principal axes; and shutter means for exposing said film through said lenses.

8. In combination: a camera structure supporting a sensitized film in a single plane; a plurality of lenses mounted on said camera structure and casting images on said film, said lenses having intersecting principal axes; and shutter means for exposing said film through said lenses.

9. In combination: a camera structure supporting a sensitized film in a single plane; a central lens mounted on said camera structure; a plurality of auxiliary lenses grouped around said central lens and covering outer areas completely surrounding and adjacent the area covered by said central lens.

10. In combination, a multi-apertured mask in the path of light rays striking a sensitized film maintained in a single plane; a central lens adapted to project a central image on said film through the central aperture of said mask; and means for projecting images of areas completely surrounding and adjacent that area covered by said central lens through side apertures surrounding said central aperture.

11. In a combination: a multi-apertured mask adjacent a sensitized film maintained in a single plane; a central lens adapted to project a central image on said film through the central aperture of said mask; a plurality of side lenses surrounding said central lens; reflecting surfaces each adapted to reflect rays emanating from an area to one side of and adjacent the area included in said central image through one of said side lenses and onto said film, the rays passing through any one lens reaching said film through a side aperture in said mask which corresponds to this lens.

12. In combination a multi-apertured mask adjacent a sensitized film maintained in a single plane; a central lens adapted to project a central image on said film through the central aperture of said mask; a plurality of side lenses surrounding said central lens; reflecting surfaces each adapted to reflect rays emanating from an area to one side of and adjacent the area included in said central image through one of said side lenses; and a plurality of reflectors, each reflector being in the path of rays passing through one of said lenses and adapted to reflect said rays through a side aperture of said mask.

13. A combination as defined in claim 10 in which said central aperture is a polygon and in which said side apertures are trapezoids, the number of trapezoidal side apertures corresponding to the number of sides on the polygonal central aperture.

14. In combination: a camera structure supporting a sensitized film in a single plane; a central lens having its principal axis substantially perpendicular to the plane of said film and adapted to photograph a central area; side lenses grouped around said central lens, the principal axes thereof being perpendicular to the principal axis of said central lens; and reflecting means for turning the rays passing through each of said side lenses and impinging these rays on said film to form side images of areas completely surrounding said central area.

15. In combination: a central lens adapted to photograph a central area and project a central image thereof on a sensitized film maintained in a single plane; a plurality of reflecting surfaces grouped around said central lens and reflecting images of side areas completely surrounding and adjacent said central area, the side area covered by any particular reflector lying on that side of said central area which is on the opposite side of the axis of said central lens from said particular reflector; means for focusing on said sensitive film the rays reflected from said reflecting surfaces to form side images grouped around said central image; and masking means for masking said central and side images.

16. In a camera, the combination of: walls forming a central light compartment; means for holding a sensitized film in a single plane; a central lens focusing rays from a central area on said film said rays passing through said central light compartment and forming a central image on said film; walls forming a plurality of light chambers surrounding said central light compartment; a side lens associated with the walls forming each light chamber; and reflecting means for each side lens, each of said reflecting means reflecting rays emanating from a side area adjacent said central area, through the side lens associated therewith, and onto said film to form a side image, said side areas completely surrounding said central area.

17. A combination as defined in claim 16 in which each of said reflecting means comprises a reflecting surface inside one of said light chambers and another reflecting surface outside thereof.

In testimony whereof, I have hereunto set my hand at Los Angeles, California, this 2nd day of February, 1927.

LEON T. ELIEL.